United States Patent [19]

DeCoursey

[11] 4,451,917

[45] May 29, 1984

[54] METHOD AND APPARATUS FOR PULSE TRAIN SYNCHRONIZATION IN PCM TRANSCEIVERS

[75] Inventor: Calvin H. DeCoursey, Reno, Nev.

[73] Assignee: Lynch Communication Systems, Inc., Reno, Nebr.

[21] Appl. No.: 225,194

[22] Filed: Jan. 15, 1981

[51] Int. Cl.³ .............................................. H04J 3/06
[52] U.S. Cl. .................................... 370/108; 375/106
[58] Field of Search ................... 370/100, 108; 375/7, 375/106, 108, 118, 119, 120; 371/47

[56] References Cited

U.S. PATENT DOCUMENTS 3,557,314  1/1971  Avignon .............................. 370/100
3,825,683  7/1974  Pitroda et al. ...................... 370/100
3,987,250 10/1976  Barbier et al. ..................... 370/100

Primary Examiner—Marc E. Bookbinder
Attorney, Agent, or Firm—Weissenberger and Peterson

[57] ABSTRACT

A method and device for phase synchronization for use particularly where a fixed internal clock signal generator is used for both receive and transmit functions.

The phase difference between the incoming pulse train and a fixed internal framing clock is detected by a counting circuit which provides an output signal indicating the interval time of the phase difference. A delaying means coupled to the incoming pulse train delays the same in response to the output signal for the time indicated thereby and provide synchronism therebetween.

7 Claims, 3 Drawing Figures

METHOD AND APPARATUS FOR PULSE TRAIN SYNCHRONIZATION IN PCM TRANSCEIVERS

TECHNICAL FIELD

The present invention relates generally to pulse code modulated transceivers, and more particularly, to a method and apparatus for synchronizing a binarily encoded data train with a fixed clock signal.

BACKGROUND ART

The T-1 type pulse code multiplex (PCM) transmission system commonly employed in the telephone industry uses a pulse format consisting of frames comprising twenty-four eight-bit segments representing the transmitted information on the twenty-four channels being multiplexed, plus one extra bit interposed between each twenty-four segment group. The extra bits are alternately main frame bits and signaling frame bits. They are arranged in a pattern such that the main frame bits alternate between 0 and 1 in even numbered frames, while the signaling frame bits alternate between 000 and 111 in odd-numbered frames. One of the basic functions of a PCM receiver is to determine which pulses in the pulse train are the main frame bits and to separate, based on that determination, the twenty-four channel segments from one another so that each segment can be fed into the proper channel after being decoded. A main frame time interval is defined as the time interval elapsing between each successive application of a main frame bit to the PCM receiver.

My copending U.S. patent application Ser. No. 950,840, filed Oct. 12, 1978, now issued as U.S. Pat. No. 4,314,368, the disclosure of which is hereby incorporated herein, discloses a framer which responds to a loss of main frame information in the incoming pulse train, or to a lack of proper synchronization between the pulse train and the receiver, by locating the main frame pulses in the pulse train and producing an output representative of the position of the main frame bit in the incoming pulse train.

In the conventional type of PCM receiver, the main frame position detected by the framer produces a reference with which the timing signal generator of the receiver is synchronized following an out-of-frame condition. This conventional framing method has a serious disadvantage in systems in which the remote transmitter is frame and bit synchronized to the remote receiver (i.e. in which the transmit circuitry and receive circuitry at the remote end use the same clock signals to reduce circuit complexity and clock distribution complexity). In such systems, the remote terminal, when equipped with a conventional framer, cannot be looped upon itself through an arbitrary delay for maintenance purposes because whenever the timing signal generator, used for both transmit and receive timing, is synchronized to the incoming frame position, that frame position shifts by an amount related to the loop delay. An out-of-frame condition immediately results.

SUMMARY OF THE INVENTION

The present invention overcomes the problems of the prior art by providing an arrangement in which the phase difference between the incoming pulse train and a fixed internal frame clock is detected by the transceiver and is used to automatically delay the incoming pulse train by the amount necessary to bring it into synchronism with the internal frame clock.

In accordance with one aspect of the invention, the device described herein accomplishes the required delay and synchronization by a very simple counting circuit.

DETAILED DESCRIPTION OF THE DRAWING

Figure 1:
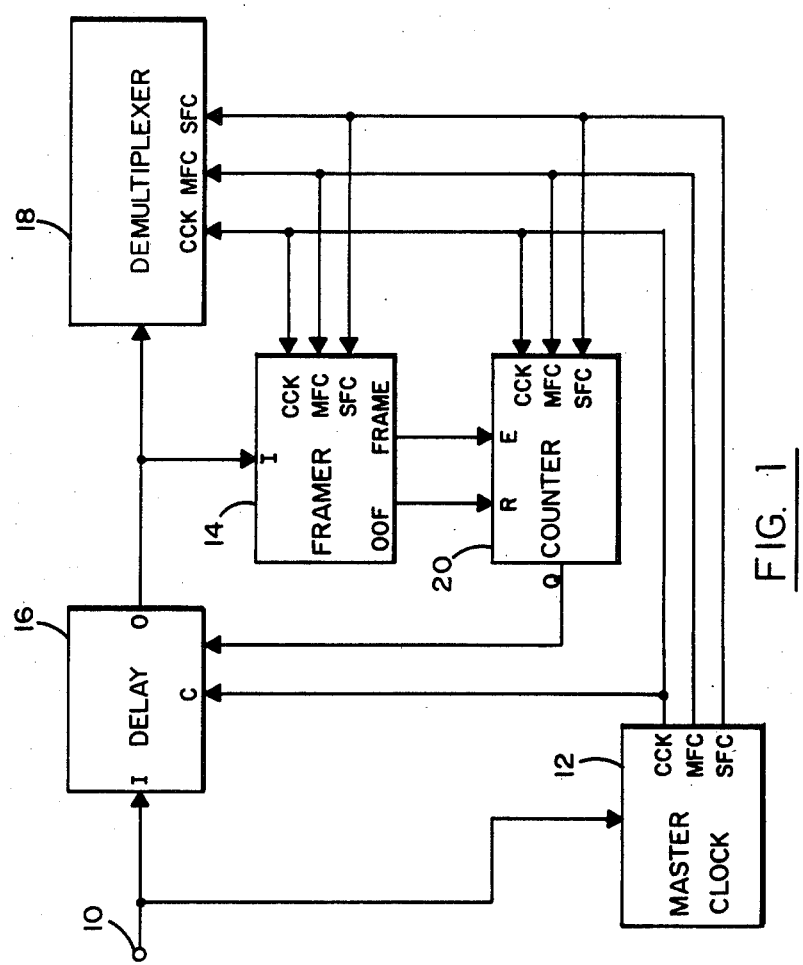
FIG. 1 is a schematic block diagram showing a receiver according to the principles of the present invention.

FIG. 1 shows a schematic block diagram of a portion of a PCM receiver constructed according to the principles of the present invention. A data train, generally being T-1 type pulse code multiplex (PCM) data converted to unipolar form, is applied to the receiver at input 10. Clock means such as master clock generator 12 are coupled to input 10 for receiving the data train. Clock information is extracted from the data train in the usual manner to develop master clock pulses at the bit rate of the incoming data train, main frame bits in the data train, and signal frame clock pulses at the same repetition rate but positioned midway between the main frame pulses.

A framer 14 is coupled to master clock generator 12 for receiving the incoming pulse train and each of the above described clock pulses or signals. A utilization device such as demultiplexer 18 is also coupled to master clock generator 12 for timing the separation of the data train into various channels. The proper operation of demultiplexer 18 depends on the synchronization of the incoming main frame bits with the main frame clock signal. A delay means 16 is also coupled to input 10 for receiving the incoming data train and delaying the data, as hereinafter described, for an appropriate time interval before applying it to demultiplexer 18 to obtain synchronization with the main frame clock signal. Delay means 16 also applies the data train to framer 14 for developing an out-of-frame (OOF) signal indicative of loss of synchronization between the main frame bit and the main frame clock signal, and a framing (FRAME) signal indicative of a main frame bit being applied to framer 14 after an out-of-frame condition has been recognized. Counter means 20 is coupled to master clock generator 12 and framer 14 for developing an output signal for application to delay means 16, the output signal being indicative of the number of bits by which the delay means 16 will delay the data train being applied at its input I.

When framer 14 develops an OOF signal, counter 20 is reset so that the output signal applied to delay means 16 will cause the data train to be passed through delay means 16 without any delay. A subsequent FRAME signal developed by framer 14 enables counter 20 to begin counting the number of master clock pulses occurring between the frame pulse of the incoming pulse trains located by framer 14, and the next pulse of the transceiver's internal main frame clock signal, thereby defining a delay interval. The output signal of counter 20 is indicative to this delay interval and is applied to delay means 16. Delay means 16 thereupon delays the data train before application to demultiplexer 18 for a time interval equal to the delay interval, thus assuring synchronization of the main frame bit with the main frame clock signal.

The general operation of master clock generator 12, frame 14 and demultiplexer 18 is conventional and has been described in my aforesaid copending U.S. patent application Ser. No. 950,840 now issued as U.S. Pat. No. 4,314,368.

Figure 3:
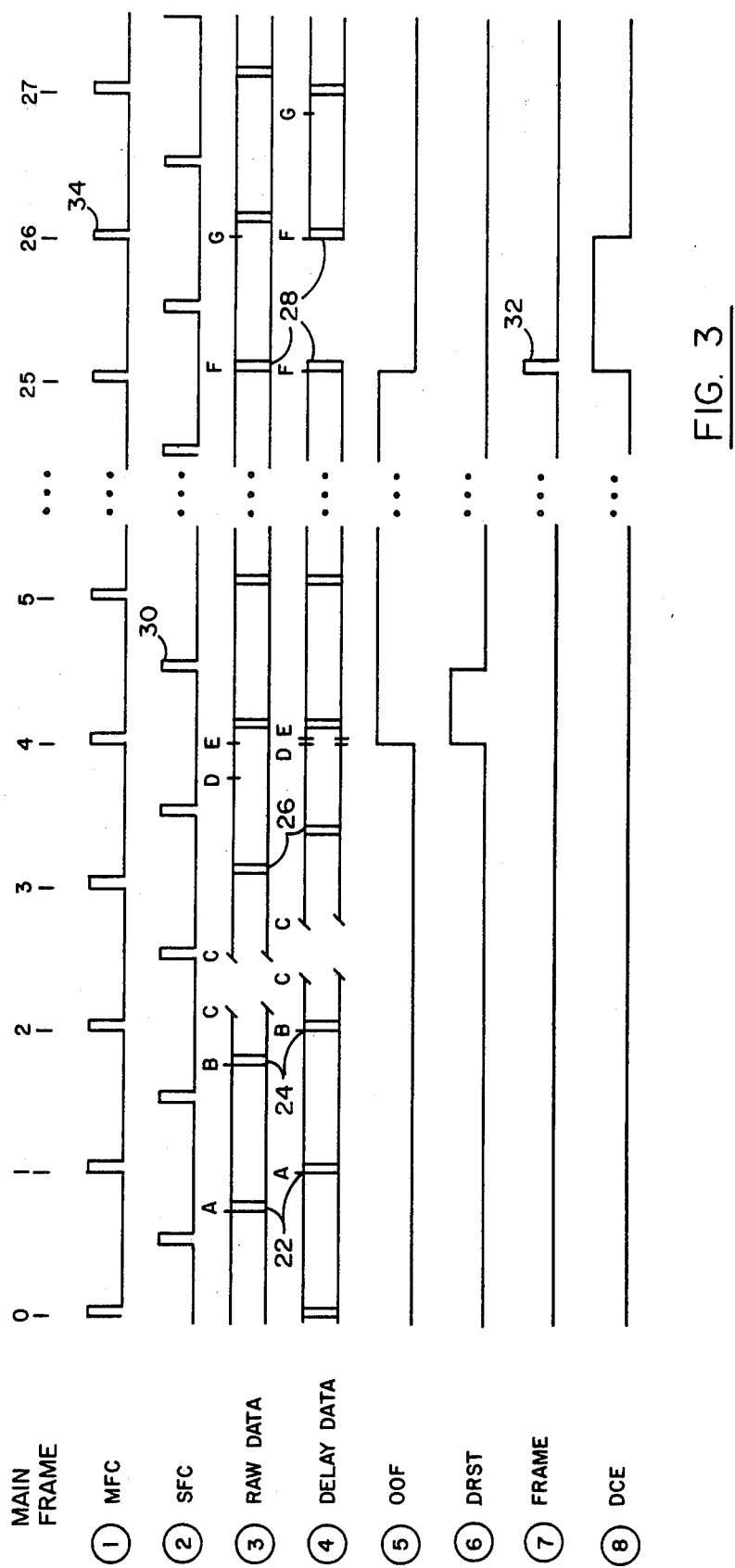
FIG. 3 is a timing diagram illustrating the sequence of operations in the receiver of FIG. 1.

FIG. 3 shows time amplitude representations of the above-described signals and their relationship to the data train. Lines 1 and 2 show the main frame clock (MFC) pulses at the beginning of each main frame and the signalling frame clock (SFC) pulses in the middle of each main frame.

Lines 3 and 4 represent, respectively, the main frame pulses of the PCM data train as applied to delay means 16 as developed at the output thereof. The lettered points in each data train representation indicate the position of an identical bit in each data train. The data applied to delay means 16, as shown by line 3, is not synchronized with the main frame clock signal (see the locations of main frame bits 22 and 24 at locations A and B respectively). However, main frame bits 22 and 24 are synchronized in the delay data representation of line 4.

Loss of synchronization may occur from time to time, as during an interruption of the reception of the data train at location C. When the data train reception has been resumed, main frame bit 26 is no longer synchronized with the main frame clock. When nonsynchronism occurs for two consecutive main frames as shown by main frames 3 and 4, the OOF signal of line 5 as developed by framer 14 goes high. This resets counter 20 so that the delay of delay means 16 is reset to zero. The effect of the output of delay means 16 when reset is best shown by locations D and E of the data trains of lines 3 and 4. The data bits applied to delay means 16 between location D and E are lost during the resetting process as shown by the coincidence of locations D and E on line 4.

The OOF signal of line 5 remains high until framer 14 has located a main frame bit 28 shown herein at location F. As will be hereinafter described, the reset signal for counter 20 shown in line 6 is cancelled by a next occurrence of a pulse 30 in the signal frame clock of line 2 after the OOF signal has gone high. The interval between main frame 5 and 25 is required for frame 14 to locate main frame bit 28 at location F, as described in my above-identified U.S. patent application Ser. No. 950,840 now issued as U.S. Pat. No. 4,314,368. Framer 14, upon locating main frame bit 28, develops pulse 32. This is the FRAME signal shown in line 7. When pulse 32 is applied to counter 20, a delay counter enable (DCE) signal, as shown in line 8, goes high and is terminated upon the next occurrence of the main frame clock signal, shown as pulse 34. The time interval between the DCE signal of line 8 going high and its resetting by pulse 34 defines a delay time interval. During the delay time interval, the raw data of line 3 applied to delay means 16 is loaded therein so as to be developed at the output of delay means 16 after the delay time interval as shown by location F of line 4. Delay means 16 will develop the main frame bit 28 of location F at its output upon the occurrence of pulse 34 of the main clock signal. Location G demonstrates that the data of line 4 has been delayed with respect to the raw data of line 3.

Figure 2:
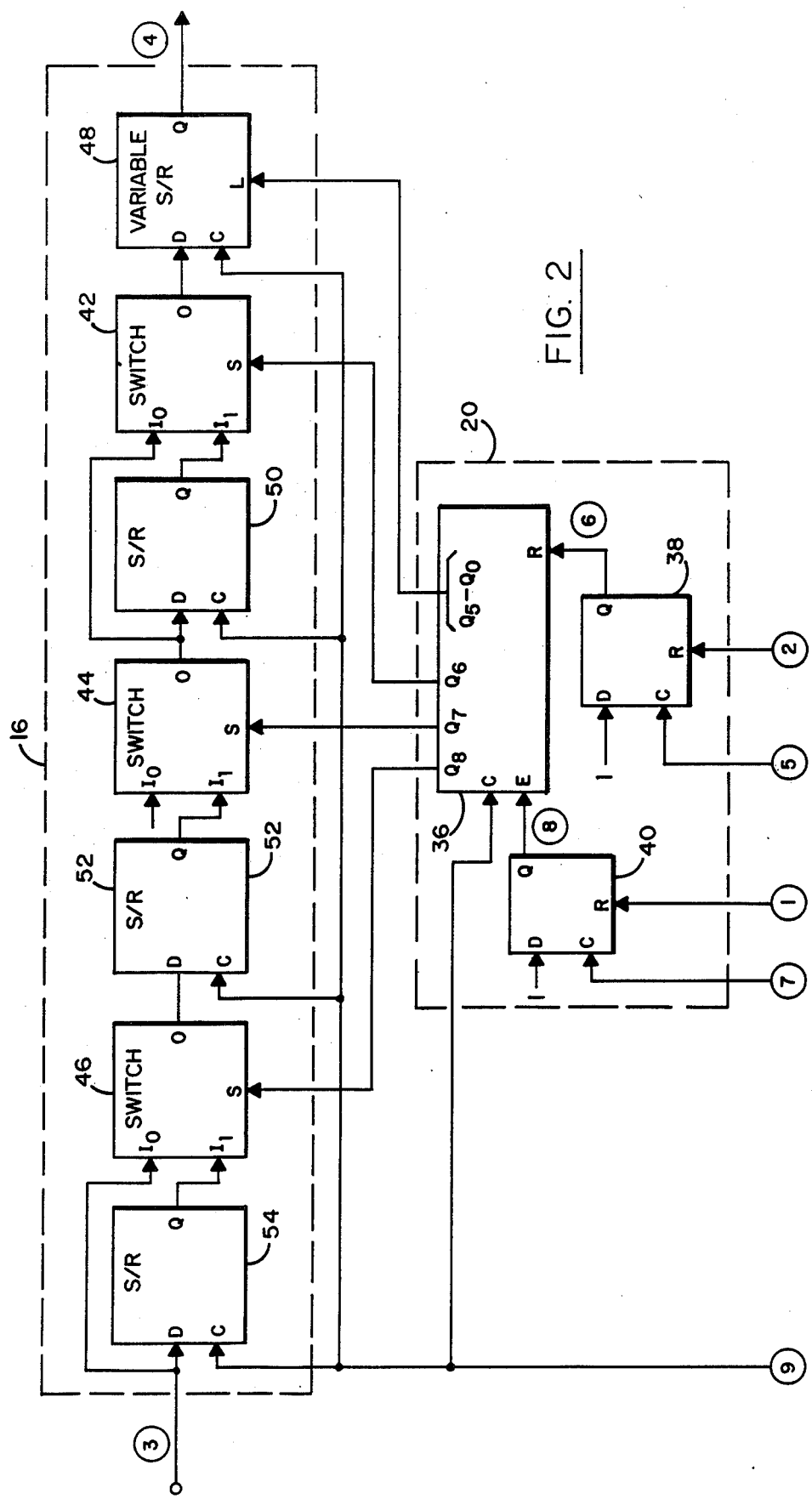
FIG. 2 is a schematic block diagram of a preferred embodiment of a portion of the receiver of FIG. 1.

FIG. 2 shows a circuit diagram, partly in block form, of a preferred embodiment of delay means 16 and counter 20 of the present invention. Counter 20 includes a binary counter 36, a first D flip-flop 38 and a second D flip-flop 40, all of conventional design. First flip-flop 38 is clocked by the OOF signal which transfers the logical 1 at the D input to the Q output for resetting binary counter 36 when the OOF signal goes high. The delay counter reset (DRST) signal, shown on line 6 of FIG. 3, is reset by pulse 30 of the signal frame clock applied to the reset (R) input of flip-flop 38. The $Q_0$ through $Q_8$ outputs of binary counter 36 are reset to 0 when the DRST signal goes high. Binary counter 36 is enabled when the DCE signal, as hereinabove described, goes high. While DCE is high, counter 36 develops at its Q output a binary representation of the number of master clock (CCK) pulses occurring until the DCE signal is reset by the MFC signal applied to the R input of flip-flop 40. The number of CCK pulses counted is equal to the number of data bits by which the data train applied to delay means 16 must be delayed.

The delay means 16 include a plurality of switches 42, 44 and 46 which operate as follows: a logical 0 applied to input S connects input $I_0$ to the output 0, and a logical 1 applied to input S connects input $I_1$ to the output 0. The delay means 16 further include a variable shift register 48, a 64-bit shift regisfter 50, a 128-bit shift register 52, and a 256-bit shift register 54. The binary representation developed at the $Q_0$ through $Q_5$ output of binary counter 36 is applied to the L input of shift register 48, the binary representation corresponding with the number of bit positions enabled within shift register 48. The $Q_6$, $Q_7$ and $Q_8$ outputs of binary counter 36 are coupled to the S inputs of switches 42, 44 and 46, respectively.

Variable shift register 48 can have any number of bits between 0 and 63. The binary representation at the Q outputs of binary counter 36 will select the appropriate inputs of switches 42, 44 and 46, and the bits available in variable shift register 48, to develop an overall shift register circuit. This circuit constitutes delay means 16. It has a number of bit positions, varying between 0 and 511 which is equal to the number of master clock pulses binarily represented by counter 36. The count developed by binary counter 36 thus corresponds to the number of bits by which delay means 16 will delay the data train applied thereto.

In the above discussion, it is assumed that the minimum delay through variable shift register 48 is zero, while commercially available variable shift registers generally have a minimum delay of one bit. It will be understood that such shift registers can be used as long as the additional bit of delay is compensated for in some conventional manner such as skewing the counter contents by one count.

I claim:

1. Apparatus for receiving and demultiplexing a PCM pulse train, comprising:
   (a) receiving means for receiving said pulse train;
   (b) variable delaying means for delaying said pulse train;
   (c) framing clock means for producing frame pulses independently of said pulse train;
   (d) demultiplexing means operatively connected to said delaying means for demultiplexing said delayed pulse train;
   (e) measuring means operatively connected to said receiving means and said framing clock means to measure the time interval between a frame bit of said delayed pulse train and a frame pulse of said framing clock means;

(f) said delaying means being operatively connected to said receiving, measuring, and demultiplexing means to delay said pulse train by said measured time interval before it is demultiplexed; and (g) master clock means for providing master clock pulses at the bit rate of said pulse train;

(h) said measuring means including counting means arranged to count the number of master clock pulses occurring between a frame pulse of the incoming pulse train and a frame pulse of said framing clock means; and (i) said delaying means including variable length shift register means, and said apparatus further comprising switching means operative in response to the count of said counting means to vary the length of said shift register means in accordance with said count.

2. In a receiver for receiving a binary encoded data train having a plurality of frame bits and a selected number of data bits disposed following each frame bit defining a main frame time interval, the receiver including means for delaying said data train, and clock means for providing a clock signal having a pulse being developed once in each main frame time interval, the receiver being operative to develop a framing signal upon application thereto of a delayed frame bit after a nonsynchronous condition of the delayed frame bits to the clock signal has been detected, synchronizing means comprising:

counter means responsive to the framing signal and to said clock signal for developing an output signal indicative of the number of data bits applied to the receiver during a time interval between said framing signal and a next occurring pulse of said clock signal defining a delay interval; and variable shift register means responsive to said output signal for delaying the data train commensurate with said delay interval and operative to synchronize each occurrence of the delayed frame bits to each occurrence of said clock signal.

3. A synchronizing means as in claim 2 in which said variable shift register means includes a number of bit positions at least as large as said selected number of data bits.

4. A receiver for receiving a binary encoded data train having a plurality of frame bits and a selected number of data bits disposed following each of the frame bits defining a main frame time interval, comprising:

delay means for variably delaying said data train;

clock means for developing a first clock signal being commensurate with the bit rate of the data train and a second clock signal being commensurate with the main frame time interval and developing a pulse once in each main frame time interval;

framer means for detecting nonsynchronism of the delayed frame bits to said second clock signal and being responsive to the delayed frame bit and said second clock signal for developing a framing signal upon application of one of the delayed frame bits to said framer means after nonsynchronism has been detected; and counter means responsive to said framing signal and each of said clock signals for counting a number of first clock signal time periods occurring between application of said framing signal and the next occurring pulse of said second clock signal and providing an output signal defining a delay interval;

said delay means including variable shift register means responsive to said output signal for delaying the data train commensurate with said delay interval and operative to synchronize each occurrence of the delayed frame bits to each occurrence of said second clock signal.

5. A method of synchronizing a received PCM pulse train with fixed clocks running at the bit rate and frame rate of said received pulse train, respectively, for demultiplexing said pulse train in synchronism with said frame rate clock, comprising the steps of:

(a) variably delaying said pulse train;

(b) counting the number of bit-rate clock pulse intervals occurring between a frame pulse of said delayed pulse train and a pulse of said frame-rate clock;

(c) adjusting said variable delay to correspond to the sum of the bit rate clock pulse intervals so counted; and (d) demultiplexing said delayed pulse train in accordance with said frame-rate clock.

6. In a receiver for receiving and variably delaying a binary encoded data train having a plurality of frame bits and a selected number of data bits disposed following each of the frame bits defining a main frame time interval, the method of synchronizing the data train to a frame pulse produced in said receiver once during each main frame time interval, comprising:

producing master pulses at the bit rate of said data bits:

locating the frame bits of said delayed data train;

producing said frame pulses independently of said data train;

counting the number of master pulses occurring in the interval between said delayed frame bit and the next occurring frame pulse, said interval defining a delay interval;

delaying said data train in shift register means having a plurality of bit positions;

varying the number of said bit positions in accordance with said number of master pulses counted during said delay interval; and coupling the output of said shift register means to a device for utilizing said delayed data train in synchronism with said frame pulses.

7. A method in accordance with claim 6 wherein said counting step utilizes binary counter means and includes:

enabling said counter means upon occurrence of a delayed frame bit;

counting each master pulse occurring after said counter means has been enabled; and disabling said counter means upon occurrence of a frame pulse.

* * * * *

UNITED STATES PATENT AND TRADEMARK OFFICE
CERTIFICATE OF CORRECTION

PATENT NO. : 4,451,917
DATED : May 29, 1984
INVENTOR(S) : Calvin H. DeCoursey

It is certified that error appears in the above—identified patent and that said Letters Patent is hereby corrected as shown below:

Column 3, line 5 — "frame" should read --framer--.

Signed and Sealed this

Second Day of October 1984

[SEAL]

Attest:

GERALD J. MOSSINGHOFF

*Attesting Officer*     *Commissioner of Patents and Trademarks*